United States Patent [19]
Kitamura et al.

[11] Patent Number: 6,005,584
[45] Date of Patent: Dec. 21, 1999

[54] METHOD OF BLENDING A PLURALITY OF PIXELS ON A TEXTURE MAP AND A PLURAL PIXEL BLENDING CIRCUIT AND IMAGE PROCESSING DEVICE USING THE SAME

[75] Inventors: Kenya Kitamura; Seisuke Morioka, both of Tokyo, Japan

[73] Assignee: Sega Enterprises, Ltd., Tokyo, Japan

[21] Appl. No.: 08/986,192

[22] Filed: Dec. 5, 1997

[30] Foreign Application Priority Data

Dec. 17, 1996 [JP] Japan ................................. 8-336823

[51] Int. Cl.⁶ .................................................. G06T 15/00
[52] U.S. Cl. ........................................ 345/430; 345/429
[58] Field of Search .................................. 345/418, 419, 345/425, 427, 428, 429, 430

[56] References Cited

U.S. PATENT DOCUMENTS

| | | | |
|---|---|---|---|
| 5,781,197 | 7/1998 | Saunders | 345/429 |
| 5,889,526 | 3/1999 | Hashimoto | 345/430 |
| 5,892,516 | 4/1999 | Alexander | 345/430 |
| 5,900,882 | 5/1999 | Jee | 345/430 |
| 5,903,270 | 5/1999 | Gentry et al. | 345/430 |

*Primary Examiner*—Phu K. Nguyen
*Assistant Examiner*—Cliff N. Vo
*Attorney, Agent, or Firm*—Dickstein Shapiro Morin & Oshinsky LLP

[57] ABSTRACT

A method of the present invention relates to a method of blending a plurality of pixels on a texture map and to a plural pixel blending circuit and image processing device using this is disclosed. The method of blending a plurality of pixels on a texture map corresponding to the pixels constituting a polygon, thereby finding texture data to be pasted on to the pixels constituting the polygon, includes the steps of: determining whether or not there are transparent pixels in said plurality of pixels on the texture map; if there are no transparent pixels, blending said plurality of pixels on the texture map in accordance with the ratio with which a pixel constituting the polygon corresponds therewith; if some of the plurality of pixels on the texture map are transparent pixels, substituting the transparent pixels by other adjacent pixels which are not transparent; and if all of the plurality of pixels on the texture map are transparent pixels, ignoring the plurality of pixels on the texture map.

8 Claims, 10 Drawing Sheets

METHOD OF BLENDING A PLURALITY OF PIXELS ON A TEXTURE MAP AND A PLURAL PIXEL BLENDING CIRCUIT AND IMAGE PROCESSING DEVICE USING THE SAME

BACKGROUND OF THE INVENTION

1. Field of the Invention

The present invention relates to a method of blending a plurality of pixels on a texture map and to a plural pixel blending circuit and image processing device using this.

2. Description of the Related Art

In recent years, image processing devices whereby the image of an object arranged in virtual three-dimensional space is displayed by a plurality of polygons using computer graphics techniques have become common. In addition, research and development is proceeding aimed at making the displayed object approach more closely to reality.

In this technical field of computer graphics, surface details of the displayed object are called "texture". The feeling of color/surface or material etc. is formed on the surface of the object by reading texture data from a texture map and mapping it onto each polygon pixel constituting the polygon in question.

FIG. 8 and FIG. 9 are views given in explanation of such mapping of texture data. Specifically, FIG. 8 is an example of a polygon stored in a frame buffer and deployed on to a two-dimensional co-ordinate plane in order to effect display on a display device such as a CRT display.

Such a polygon P as displayed has three vertices A, B, C; the respective vertices have, as vertex data, co-ordinates on the X, Y axes on a texture map that stores the texture data that is to be mapped.

For example, as the stored position of the texture map mapped onto the pixel of vertex A, as shown in FIG. 8, there are provided co-ordinate data $(T_{xo}, T_{yo})$ on the texture map of FIG. 9. Likewise, vertex B has co-ordinate data $(T_{x1}, T_{y1})$ and vertex C has co-ordinate data $(T_{x2}, T_{y2})$.

Furthermore, in regard to the pixel of point D on the edge line of vertex A and vertex B for example, the data $(T_{xi}, T_{yi})$ of co-ordinates D on the texture map are obtained as shown in FIG. 8 by linear or perspective interpolation of co-ordinate data $(T_{xo}, T_{yo})$ of vertex A and co-ordinate data $(T_{x1}, T_{y1})$ of vertex B.

The co-ordinate data on the texture map are likewise found by linear or perspective interpolation for all the other pixels constituting polygon P.

On the other hand, regarding the texture map, for each type of object texture, for example if the object is rock, data representing a rocky surface or if the object is wooden, data representing a wooden surface are deployed in map fashion and stored in a memory device. Specifically, this changes non-uniformly and with continuity such that the rocky surface on a single rock or the tree surface of a single tree can not be defined by a single data entry.

The texture map therefore consists in deployment of textures of for example a rocky surface or tree surface in the X, Y axis co-ordinate plane, the texture of a rocky surface or tree surface etc. at a corresponding specified position being found by specifying the X, Y axis co-ordinate position.

Let us now consider the relationship between the biaxial plane of a texture map shown in FIG. 10 and a polygon pixel. In FIG. 10, region 70 enclosed by the thick line is a range in which texture map co-ordinates are specified corresponding to one pixel constituting a polygon. Regions 71~74 are a plurality of pixels on the texture map. Consequently, in this region 70, texture based on the texture data read from the texture map is mapped on to the pixel in question.

However, one pixel constituting a polygon as described above does not necessarily correspond to a pixel of the texture map and a region 70 constituting a polygon and specified by one pixel may span a plurality of adjacent pixels of the texture map. In the example of FIG. 10, region 70 is overlaid on four adjacent pixels 71~74 of the texture map.

Consequently, for the texture in respect of one pixel constituting a polygon corresponding to region 70, the corresponding texture data is found by blending the data entries of four adjacent pixels 71~74 in accordance with the area overlaid in region 70.

However, in some cases it is necessary to represent a portion in which a hole is formed in part of the polygon. The texture data corresponding to the portion where this hole is formed is of the transparent coloration. Consequently, in this case, when mapping texture on to the polygon, transparent pixels will be included in the plurality of pixels corresponding to the polygon in question on the texture map that is blended therewith.

Care has therefore to be taken in effecting blending in such cases. The reason for this is that, if blending is effected at pixels that are adjacent to transparent coloration, there is a risk of abnormal color tone being produced.

If, when texture data of a plurality of pixels corresponding to an area are blended as described above, the colors of the pixels 71~74 of the texture map in FIG. 10 are respectively designated as color0, color1, color2, and color3, and color1 is transparent, a normalized calculation formula estimated from the contributions in accordance with the relevant area may be represented by Mathematical Expression (1) or Mathematical Expression (2).

$$\text{Color}=\{\text{color0}(1-x)(1-y)+\text{color2}(1-x)\cdot y+\text{color3}\cdot x\cdot y\}/\{(1-x)(1-y)+(1-x)\cdot y+x\cdot y\}. \quad (1)$$

Or:

$$\text{Color}=\text{color0}(1-x)(1-y)+\text{color1}x(1-y)+\text{color2}(1-x)y+\text{color3}xy \quad (2)$$

In Mathematical Expression 1, the calculation is performed excluding the data of pixel 72 of color1, which is transparent. In contrast, Mathematical Expression 2 is calculated including the data of pixel 72 of color1, which is transparent.

There are problems with the methods of calculation of both Mathematical Expression 1 and Mathematical Expression 2. In the former case, the color of pixels that are transparent can be neglected. However, the circuit layout to perform division is complicated.

On the other hand, in the case of the latter, though a circuit layout to perform division is not necessary, pixel 72, which ought to be transparent, is not excluded from the color blending process. In this case, transparent pixel 72 must also have color applied to it to match with the color of adjacent pixels on the texture map: this complicates the data processing.

SUMMARY OF THE INVENTION

In order to solve such problems, an object of the present invention is therefore to provide a plural pixel blending method and circuit of straightforward construction constituted by a circuit construction in which color blending is not performed in respect of a pixel that is transparent on the texture map.

A further object of the present invention is to provide an image processing device employing a plural pixel blending method and circuit according to the present invention.

A first method of blending a plurality of pixels in order to achieve the above object of the present invention consists in blending a plurality of pixels on a texture map corresponding to the pixels constituting a polygon, thereby finding texture data to be mapped on to pixels constituting this polygon, in which it is determined whether or not there are transparent pixels in a plurality of pixels on this texture map; if there are no transparent pixels, blending of the plurality of pixels on this texture map is effected in accordance with the ratio with which a pixel constituting the polygon corresponds therewith; if some of the plurality of pixels on this texture map are transparent pixels, these transparent pixels are substituted by other adjacent pixels which are not transparent; and if all of the plurality of pixels on this texture map are transparent pixels, the plurality of pixels on this texture map are ignored.

Further, a second method of blending a plurality of pixels according to the present invention consists in blending a plurality of pixels by combining a plurality of pixels on a texture map corresponding to the pixels constituting a polygon, thereby finding texture data to be mapped on to pixels constituting this polygon, includes a first step of determining whether or not there are transparent pixels in a first plurality of pixels adjacent to one row address direction on this texture map, and, if there are no transparent pixels in this first plurality of pixels adjacent to one row address direction, effecting blending in accordance with the ratio with which the pixels constituting this polygon correspond to this first plurality of pixels, and, if some of this first plurality of pixels adjacent to one row address direction are transparent pixels, substituting these transparent pixels by adjacent pixels which are not transparent, and, if all of this first plurality of pixels adjacent to one row address direction are transparent pixels, ignoring this plurality of pixels; a second step of determining whether or not there are transparent pixels in a second plurality of pixels adjacent to a row address direction adjacent this one row address direction on this texture map, and, if there are no transparent pixels in this second plurality of pixels adjacent to a row address direction adjacent this one row, effecting blending in accordance with the ratio with which the pixels constituting this polygon correspond to this second plurality of pixels, and, if some of this second plurality of pixels adjacent to a row address direction adjacent to this one row are transparent pixels, substituting these transparent pixels by adjacent pixels which are not transparent, and, if all of this second plurality of pixels adjacent to a row address direction adjacent to this one row are transparent pixels, ignoring this second plurality of pixels; and a third step of comparing first texture pixel data obtained by this first step with second texture pixel data obtained by this second step and, if neither the first nor the second texture pixel data are transparent, effecting blending in accordance with the ratio with which the pixels constituting this polygon correspond to this first and second texture pixel data, and, if any of this first and second texture pixel data are transparent, substituting these transparent texture pixel data by other texture pixel data which are not transparent, and, if all they are all transparent, ignoring this first and second texture pixel data.

Also a first construction of a plural pixel blending circuit according to the present invention wherein a plurality of pixels on a texture map corresponding to the pixels constituting a polygon are combined, thereby finding texture data to be mapped on to pixels constituting this polygon, includes: an interpolation calculation circuit whereby blending is effected in accordance with the ratio with which a pixel constituting this polygon corresponds therewith, of a plurality of adjacent pixels on the texture map; and a selection circuit which inputs the output of this interpolation calculation circuit and this plurality of adjacent pixels and, as selection signal, flags indicating whether or not this plurality of adjacent pixels are respectively transparent, and, depending on these selection signals, if none of this plurality of pixels are transparent, selects the output of this interpolation calculation circuit, or, if any of this plurality of pixels are transparent, selects the pixels, of this plurality of pixels, which are not transparent, and, if all the plurality of pixels are transparent, inhibits the output.

Furthermore a second construction of a plural pixel blending circuit according to the present invention further includes, in the first construction of a plural pixel blending circuit, an AND gate that outputs AND logic of the plurality of adjacent pixels.

Furthermore a third construction of a plural pixel blending circuit according to the present invention includes three plural pixel blending circuits according to the second construction of a plural pixel blending circuit wherein the outputs of the first and second plural pixel blending circuits constitute two inputs of the interpolation computation circuit of the third plural pixel blending circuit. Also, a first construction of an image processing device according to the present invention for image display of an object arranged in virtual three-dimensional space by constituting a plurality of polygons, includes a memory device in which is stored a texture map that stores texture data at a plurality of co-ordinate positions specified by X and Y axes; and a texture mapping circuit that maps texture data that is read from this texture map onto each pixel constituting the plurality of respective polygons wherein this texture mapping circuit having a plural pixel blending circuit including an interpolation calculation circuit whereby blending is effected in accordance with the ratio with which a pixel constituting this polygon corresponds therewith, of a plurality of adjacent pixels on the texture map; and a selection circuit which inputs the output of this interpolation calculation circuit and this plurality of adjacent pixels and, as selection signal, flags indicating whether or not this plurality of adjacent pixels are respectively transparent, and, depending on these selection signals, if none of this plurality of pixels are transparent, selects the output of this interpolation calculation circuit, or, if any of this plurality of pixels are transparent, selects the pixels, of this plurality of pixels, which are not transparent, and if all the plurality of pixels are transparent, inhibits the output.

Further, in a second construction of an image processing device according to the present invention, in the first construction, the plural pixel blending circuit further comprises an AND gate that outputs AND logic of the plurality of adjacent pixels.

Further, in a second construction of an image processing device according to the present invention, in the first construction, includes three plural pixel blending circuits wherein the outputs of the first and second plural pixel blending circuits constitute two inputs of the interpolation computation circuit of the third plural pixel blending circuit.

DESCRIPTION OF THE PREFERRED EMBODIMENTS

Figure 1:
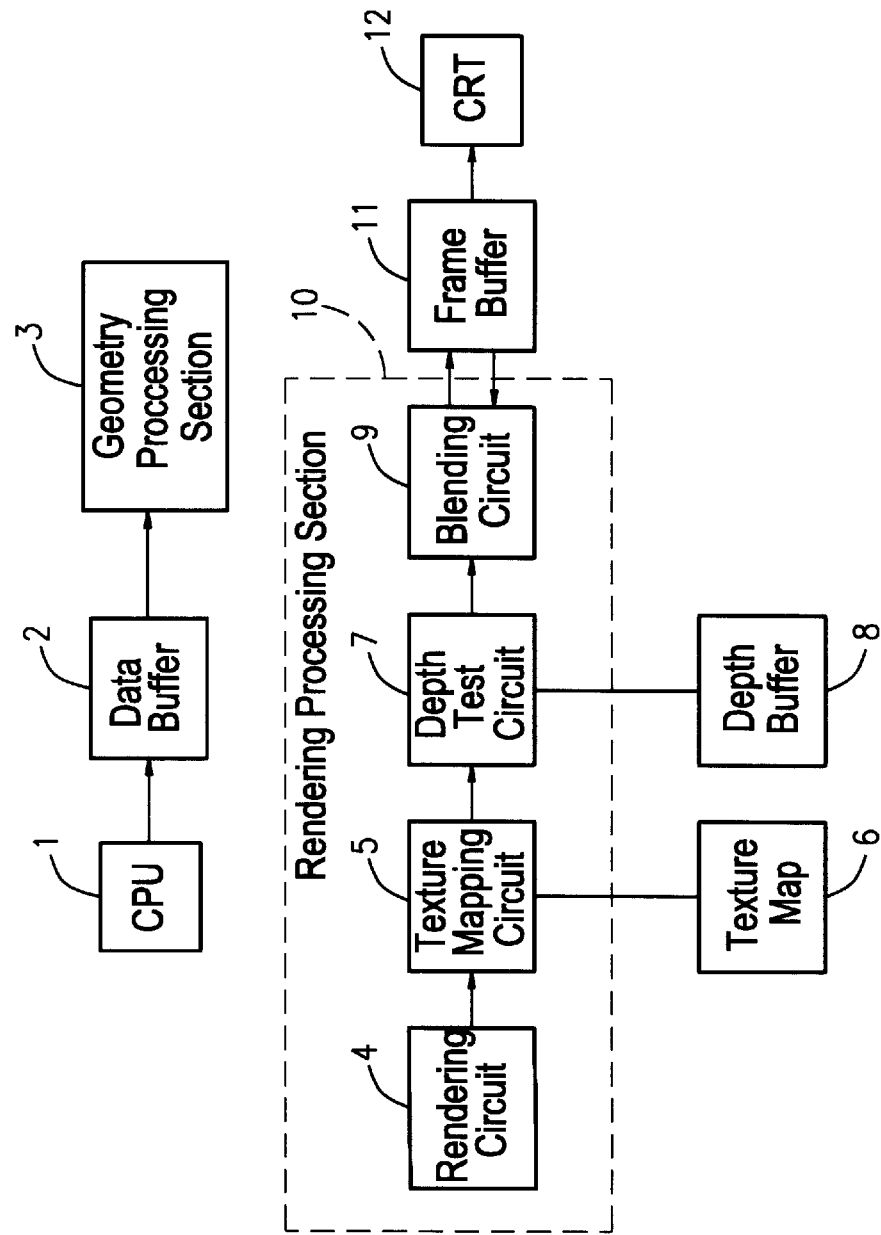
FIG. 1 is a block diagram of the layout of a pixel processing device wherein a pixel blending circuit according to the present invention is employed in a texture mapping circuit.

Embodiments of the present invention are described below with reference to the drawings. In the drawings, identical or similar items are described by attaching thereto the same reference numerals or reference symbols.

FIG. 1 is a layout block diagram of an image processing device using a plural pixel blending method according to the present invention.

In FIG. 1, CPU1 controls the execution of a program for processing an image using polygons. CPU1 has connected to it a data buffer 2 constituted by a memory in which there are temporarily stored register set functions and/or vertex data of polygons displayed on display device 12 as the program is executed.

This data buffer 2 is connected to a geometry processing section 3 for converting to a two-dimensional co-ordinate system polygons arranged in three-dimensional space in accordance with the aforesaid data, in order for these to be displayed on display device 12.

There is further connected a rendering processing section 10 for performing coloring, shading, and mapping of texture in respect of each of the displayed polygons. On the output side of rendering processing section 10 there is connected a frame buffer 11 which holds one screen of displayed data. A display device 12 such as a CRT is connected to frame buffer 11 and successively displays the content of frame buffer 11.

In accordance with the speed of program execution and processing, geometry processing section 3 reads from data buffer 2 polygon vertex data (containing vertex co-ordinates, vertex color, texture map co-ordinates, vertex transparency and vertex normal vector etc.) and/or register set functions.

Geometry processing section 3 disposes the polygons in three-dimensional space and determines what is to be displayed up to what region of three-dimensional space by a given view port, and performs calculation etc. of brightness of each vertex based on the normal vector. It also performs vertex removal i.e. "clipping" of polygons that extend beyond the view port. In addition, it performs conversion of co-ordinates from three-dimensional to two-dimensional by projecting a polygon arranged at a view port on to a two-dimensional plane using a prescribed viewpoint as reference point.

The polygon data obtained by co-ordinate conversion to two-dimensional co-ordinates is sent to rendering processing section 10. Rendering processing section 10 includes: a rendering circuit 4, a texture mapping circuit 5, a depth test circuit 7, and a blending circuit 9.

Figure 8:
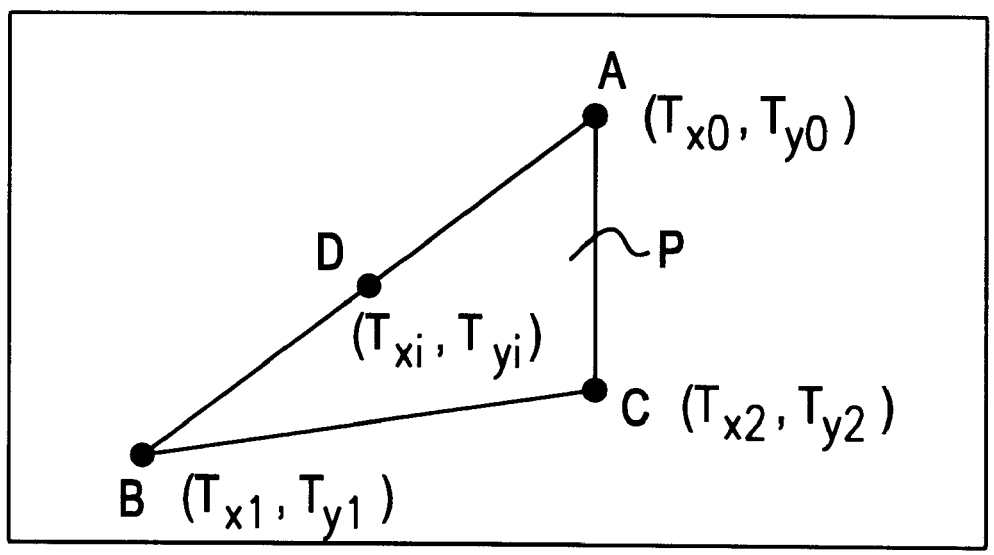
FIG. 8 is an example of a polygon stored in a frame buffer which is deployed in a two-dimensional co-ordinate plane for display on a display device such as a CRT display.
Figure 9:
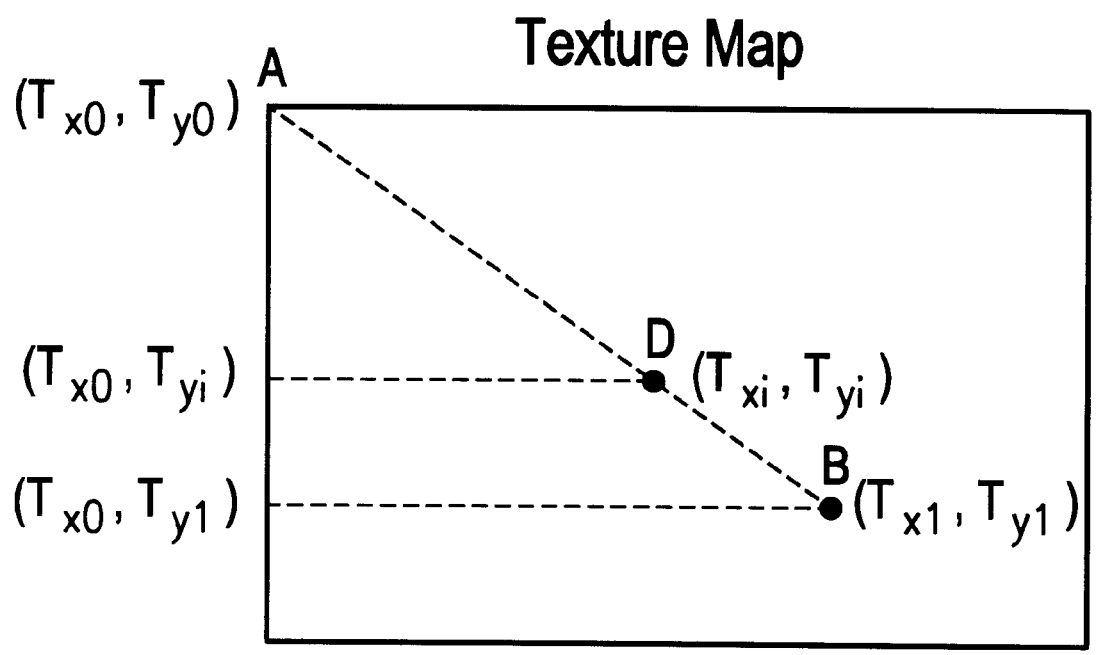
FIG. 9 is a diagram given in explanation of mapping of texture data on to the pixels of a polygon.

Rendering circuit 4 has the function of calculating the information of pixels within the range defined by the vertices of the polygon and of passing this information to the other circuits within rendering processing section 10. This calculation is performed by interpolation between the vertices of the polygon such as for example linear interpolation or perspective interpolation based on the information of the two corresponding vertices of pixel information. This is the same as finding the data of a pixel D from vertex data of vertices A, B described above in FIG. 8.

Texture mapping circuit 5 is a circuit that reads texture corresponding to a pixel from texture map 6 and finds the color of the pixel by calculation. The plural pixel blending method and circuit construction of the present invention are applied to the construction of a circuit for finding pixel color by calculation.

The method and circuit construction of these parts will therefore be described in detail below as an embodiment of the present invention.

Depth test circuit 7 is a circuit that compares the in-front/behind relationship of a plurality of polygons and stores data as to which polygon is to be arranged furthest forward in depth buffer 8. Specifically, depth buffer 8 stores the Z value of the pixels of a figure (polygon) that was previously drawn.

Thus, when a new polygon is to be displayed at a position overlapping with a polygon previously drawn on the screen, the Z value of the pixels constituting the new polygon is compared with the Z value of the pixels of the polygon that was previously drawn, read from depth buffer 8. If the result of the comparison is that the pixels of the new polygon should be in front, the Z values of the corresponding pixels are written into depth buffer 8.

Pixels of a polygon that was previously drawn, which is read from frame buffer 11, with the color information of the pixels of a polygon to be newly processed and writes the result in frame buffer 11. The information of this frame buffer 11 is displayed by sending it to display device 12, one screen at a time.

Next, an embodiment of a plural pixel blending method and circuit employing the present invention in an image processing device constructed as above will be described.

As described above, when texture data of one pixel constituting a polygon is found, since the pixel has an area at a co-ordinate data position on the texture map of this one pixel, it overlaps with a plurality of adjacent pixels on the texture map. Texture data for one pixel constituting this polygon is therefore generated by blending a plurality of adjacent pixel data of the texture map.

Figure 2:
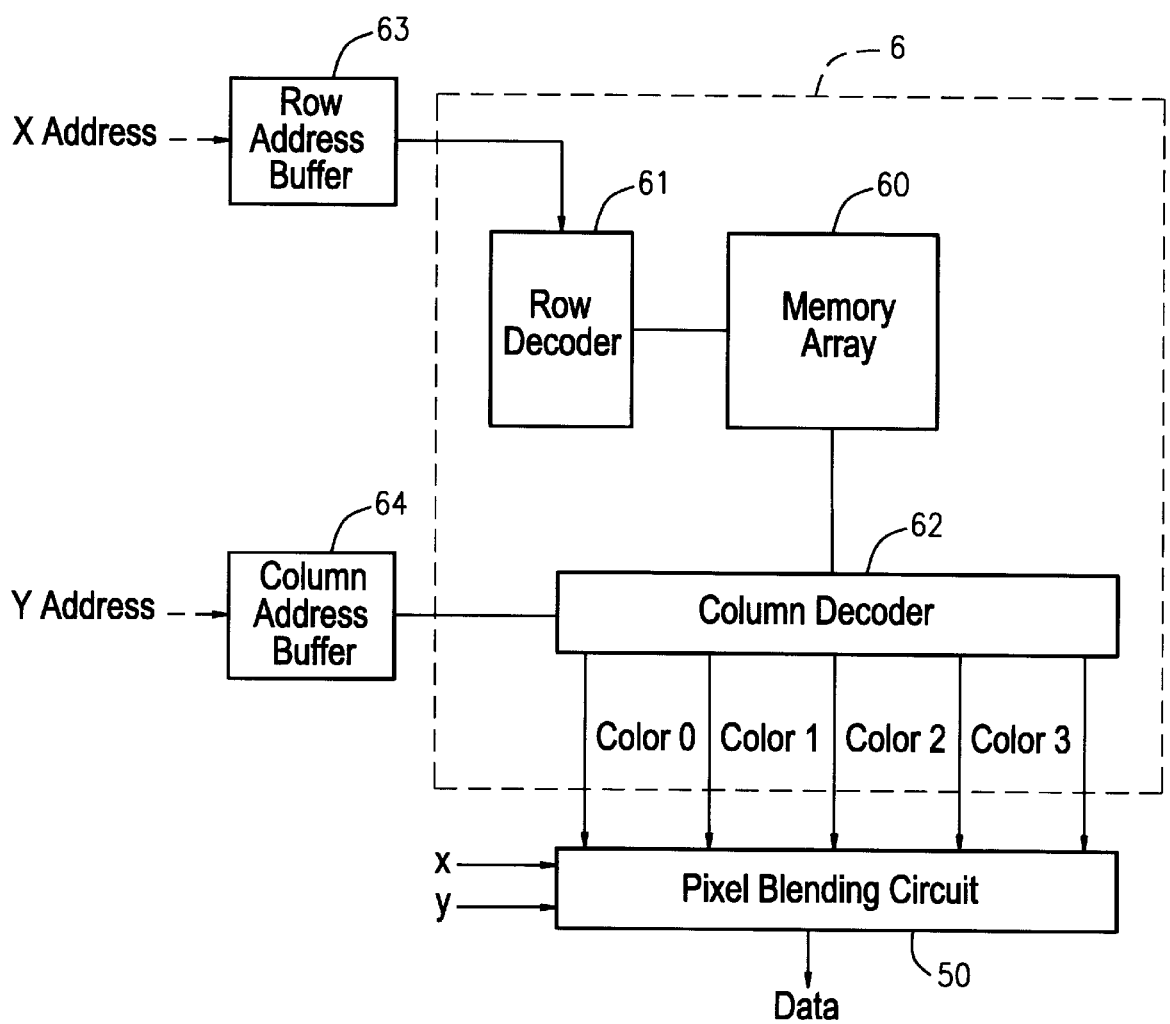
FIG. 2 is a diagram given in explanation of the relationship between a texture mapping circuit to which the present invention has been applied and a texture map memory.

FIG. 2 is a block diagram showing details of a pixel blending circuit 50 constituting a main function circuit included in texture mapping circuit 5 of FIG. 1 and texture map 6.

Texture map 6 comprises a memory array 60 in which texture data are deployed and stored in correspondence with polygons, a row decoder 61 and a column decoder 62. In addition, texture pasting circuit 5 includes address buffers 63, 64 that send respectively a row address and column address to row address decoder 61 and column address decoder 62 of texture map 6.

Texture pasting circuit 5 extracts co-ordinate position data of texture map 6 from the polygon pixel data input from rendering circuit 4 and sends these to row address decoder 61 and column address decoder 62.

Memory array 60 reads the data of color0, color1, color2 and color3 of the four pixels 71~74 at the corresponding co-ordinate positions by means of the four row addresses and column addresses that are input from texture mapping circuit 5, and inputs these to plural pixel blending circuit 50.

Figure 4:
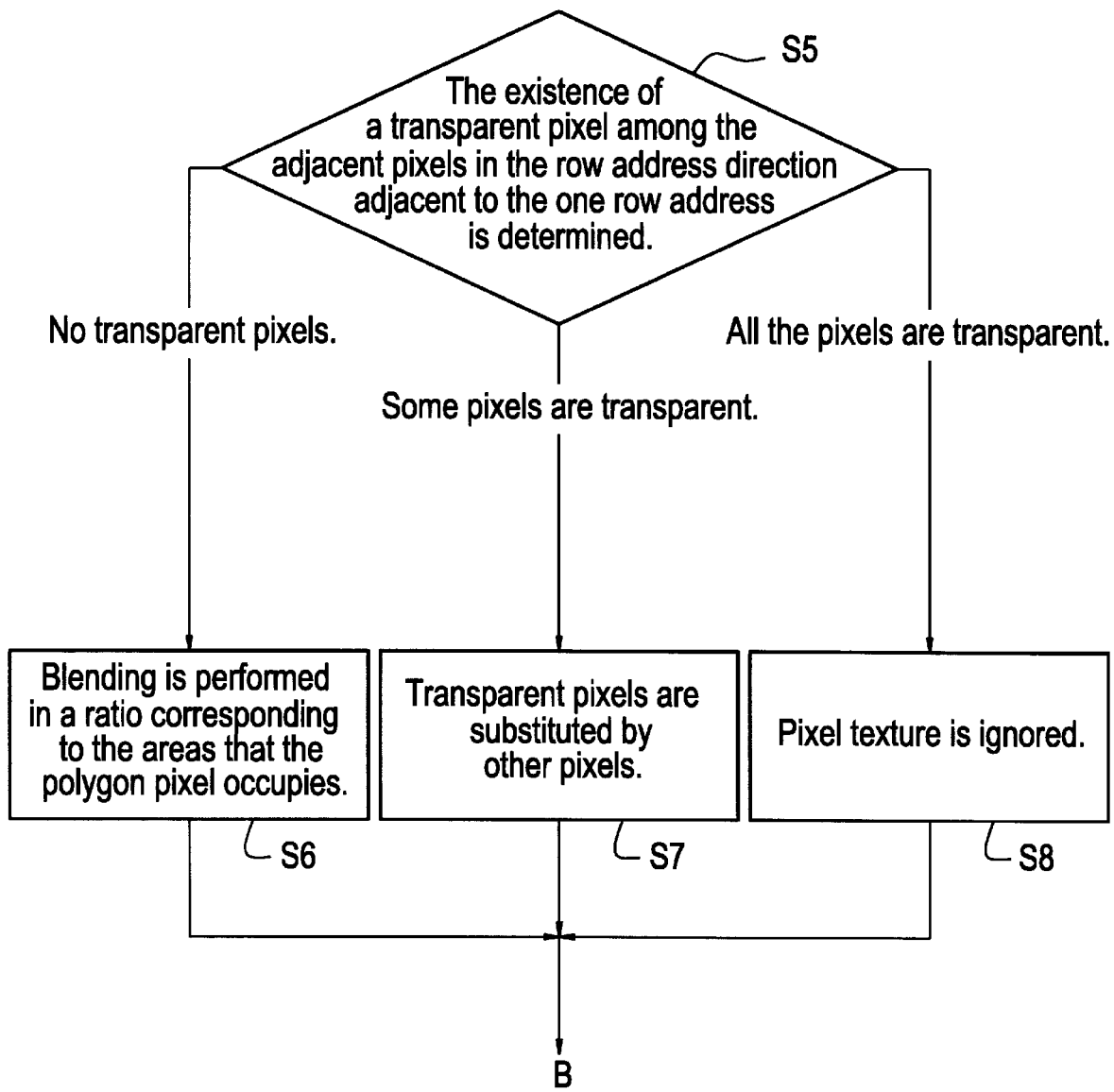
FIG. 4 is a flow chart given in explanation of blending of adjacent pixels of a row adjacent to the one row in the operation of plural pixel blending circuit 50.
Figure 5:
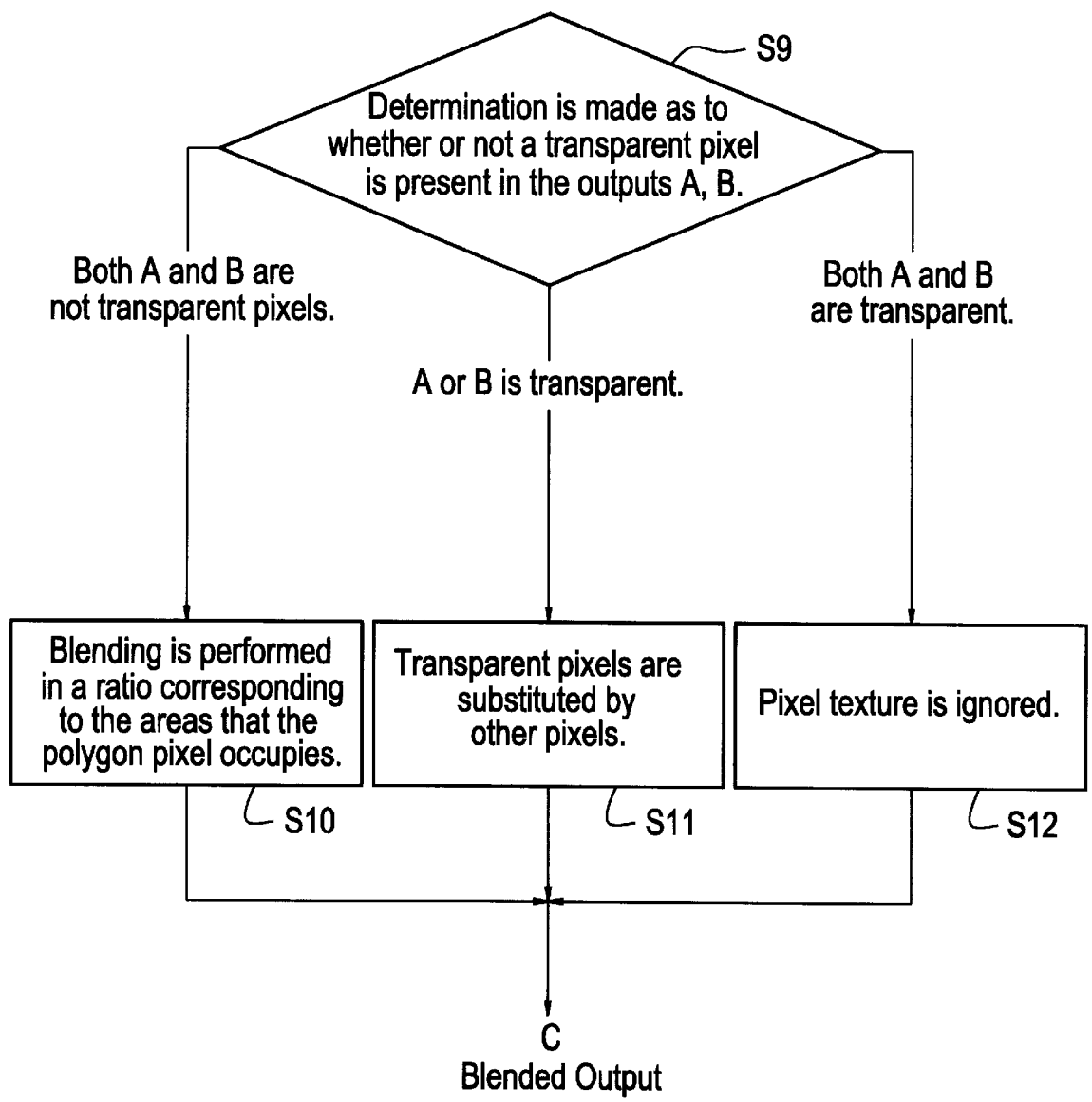
FIG. 5 is a flow chart given in explanation of blending of the results obtained by the flow of FIG. 3 and FIG. 4 in operation in plural pixel blending circuit 50.

In addition, the values of the offset (x and y) of the pixel position of texture map 60 and the co-ordinates specifying the polygon pixel found by texture mapping circuit 5 are input to plural pixel blending circuit 50. The flow of operation in this plural pixel blending circuit 50 is as shown in FIG. 3~FIG. 5.

Figure 10:
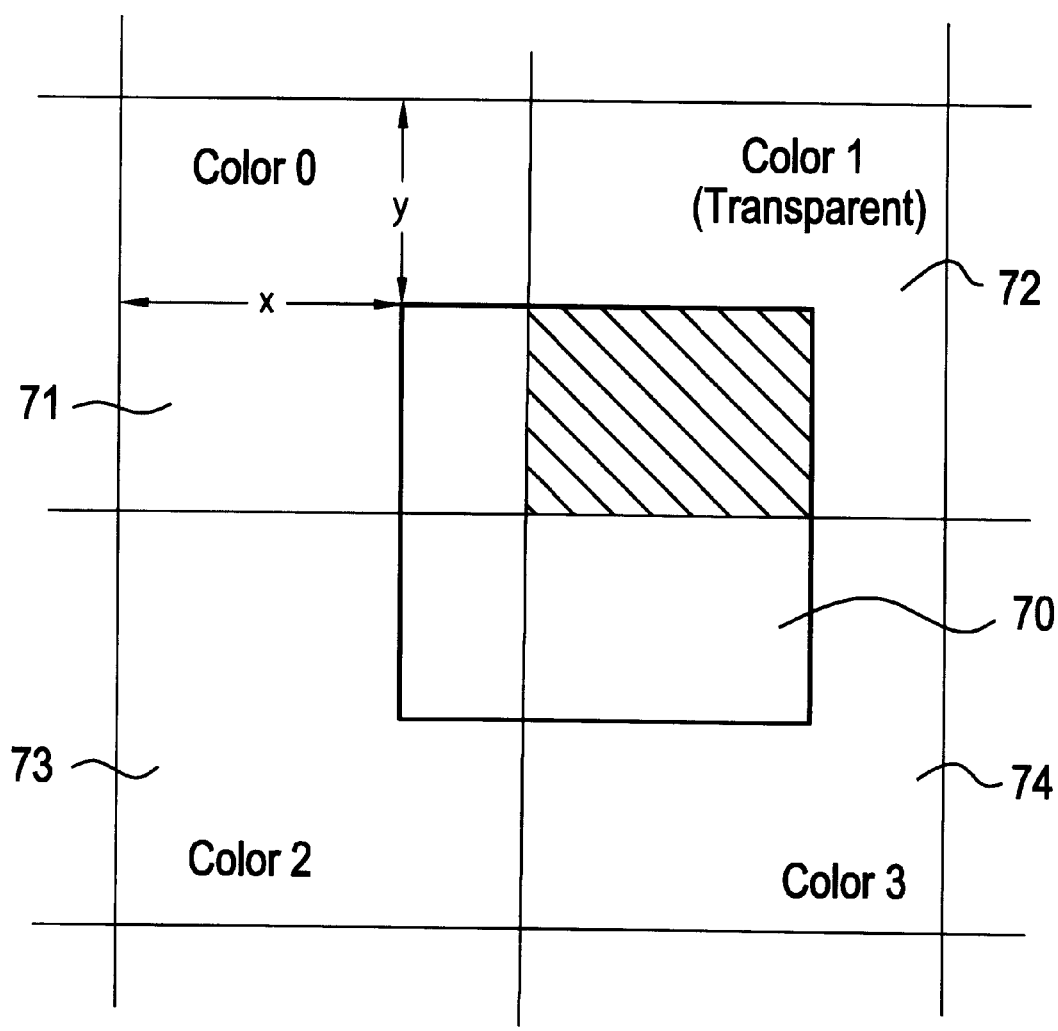
FIG. 10 is a view given in explanation of calculation in which the pixels of a polygon are found by blending of a plurality of texture pixel data.

Using the example shown in FIG. 10, let us consider the case where texture data (color) to be mapped on to polygon pixel 70 are found by blending the textures (colors: color0, color1, color2, color3) of pixels 71 to 74 of the texture memory.

Figure 3:
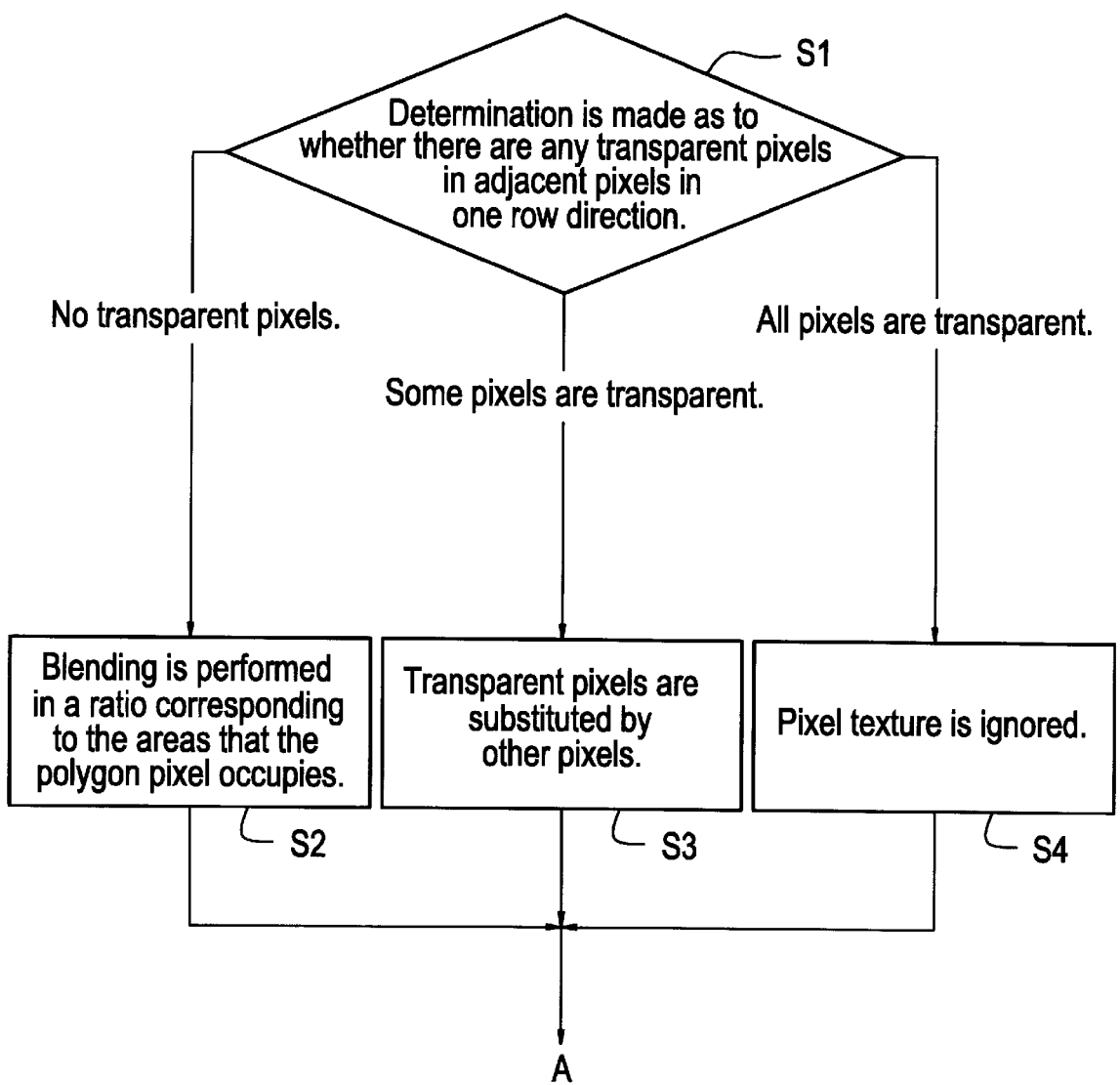
FIG. 3 is a flow chart given in explanation of blending of one row of adjacent pixels in the operation of a plural pixel blending circuit 50.

In FIG. 3, a determination is made as to whether there are any transparent pixels in adjacent pixels in one row address direction (step S1). If the result of this determination is that none of the adjacent pixels is transparent, blending is performed (step S2) in a ratio corresponding to the areas that the polygon pixel occupies.

If any of the adjacent pixels are transparent, these transparent pixels are substituted by other pixels (step S3). Furthermore, if all the adjacent pixels are transparent pixels, pixel texture is ignored (step S4).

Applying this process to FIG. 10, pixels 71 and 72 correspond to the adjacent pixels in one row address direction; since pixel 72 is transparent, the processing of step S3 is invoked and the transparent portion constituted by pixel 72 is replaced by an opaque pixel, pixel 71. In other words, pixel 71 (color0) itself becomes output A (color01).

Furthermore, in FIG. 4, the existence of a transparent pixel among the adjacent pixels in the row address direction adjacent to the one row address is determined (step S5). The processing that is produced as a result of this determination, if there are no transparent pixels, is the processing of (step S6) or, if some pixels are transparent, is the processing of (step S7), or, if all the pixels are transparent, is the processing of (step S8); these respectively correspond to (step S2), (step S3), and (step S4) of FIG. 3.

Consequently, if the processing of FIG. 4 is applied to FIG. 10, the adjacent pixels in an adjacent row address direction are pixels 73 and 74. Also, since none of the pixels are transparent, blending is effected in accordance with the ratio occupied by polygon pixel 70 with respect to pixels 73 and 74, producing output B (color23).

In addition, FIG. 5 is the processing based on outputs A, B of FIG. 3 and FIG. 4. A determination is made as to whether or not a transparent pixel is present in the outputs A, B (step S9). The processing that is invoked as a result of this determination, if there are no transparent pixels, is the processing of (step S10), or, if some of the pixels are transparent, is the processing of (step S11), or, if all the pixels are transparent, is the processing of (step S12); these respectively correspond to (step S2, S6), (step S3, S7) and (step S4, S8) of FIG. 3 and FIG. 4.

Consequently, when the processing of FIG. 5 is applied in FIG. 10, since none of output A (color01) or B (color23) is transparent, output C (color) is obtained by effecting blending in accordance with the ratio of the size of the area occupied by polygon pixel 70 with respect to adjacent pixels 71, 71 of the one row address direction and the size of the area occupied by pixel 70 of the polygon with respect to adjacent pixels 73, 74 of the adjacent row address direction.

Figure 6:
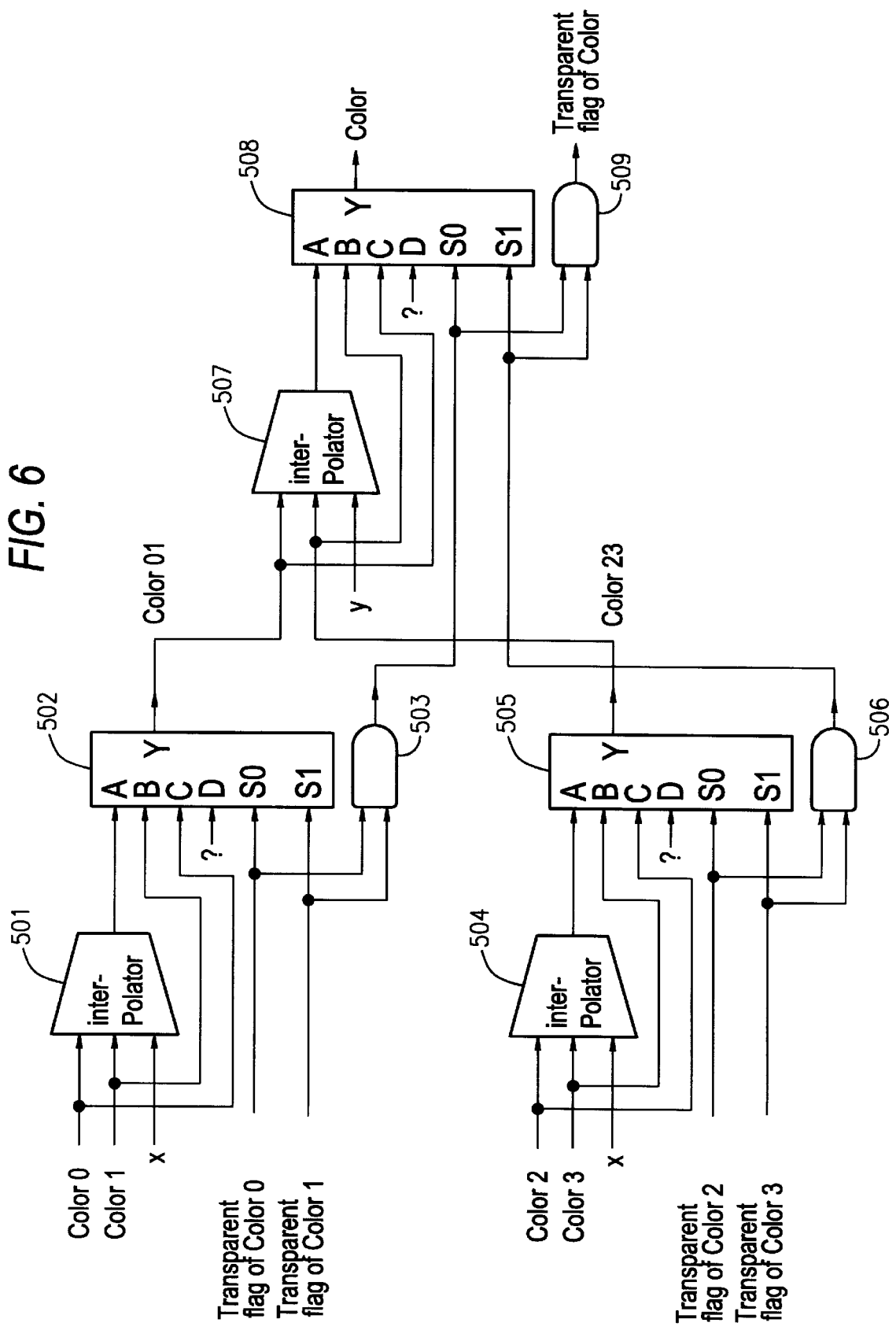
FIG. 6 is a layout block diagram of an embodiment of a pixel blending circuit according to the present invention.

FIG. 6 is a circuit constituting an embodiment of a plural pixel blending circuit 50 employing a plural pixel blending method according to the present invention. This is constituted by three identical circuits corresponding to the processing of FIG. 3 to FIG. 5 above. Data combining pixels 71 and 72 shown in FIG. 10 i.e. output color01 blending color0 and color1 is obtained by means of interpolation calculating circuit 501, selection circuit 502 and AND gate 503.

A first circuit constituted by interpolation calculating circuit 501, selection circuit 502 and AND gate 503 therefore performs the calculation of Mathematical Expression (3).

$$\text{Color01} = \text{color0}(1-x) + \text{color1} \cdot x \quad (3)$$

Likewise, a second circuit constituted by interpolation calculating circuit 504, selection circuit 505 and AND gate 506 performs the calculation of Mathematical Expression (4) to obtain output color23 blending color2 and color3.

$$\text{Color23} = \text{color2}(1-x) + \text{color3} \cdot x \quad (4)$$

Furthermore, a third circuit consisting of interpolation calculation circuit 507, selection circuit 508 and AND gate 509 performs the calculation of Mathematical Expression 5 to obtain as final output the color resulting from the blending of color02 and color23 found as above.

$$\text{Color} = \text{color01}(1-y) + \text{color23} \cdot y \quad (5)$$

Since the principle of calculation of first~third circuits described above is identical, the principles of operation of these circuits will be described taking as a typical example the first circuit consisting of interpolation calculation circuit 501, selection circuit 502 and AND gate 503.

First of all, in the first circuit described above, interpolation calculation circuit 501 blends the two pixels 71, 72 of color0 and color1. An example layout of interpolation calculation circuits 501, 504 and 507 is shown in FIG. 7.

Figure 7:
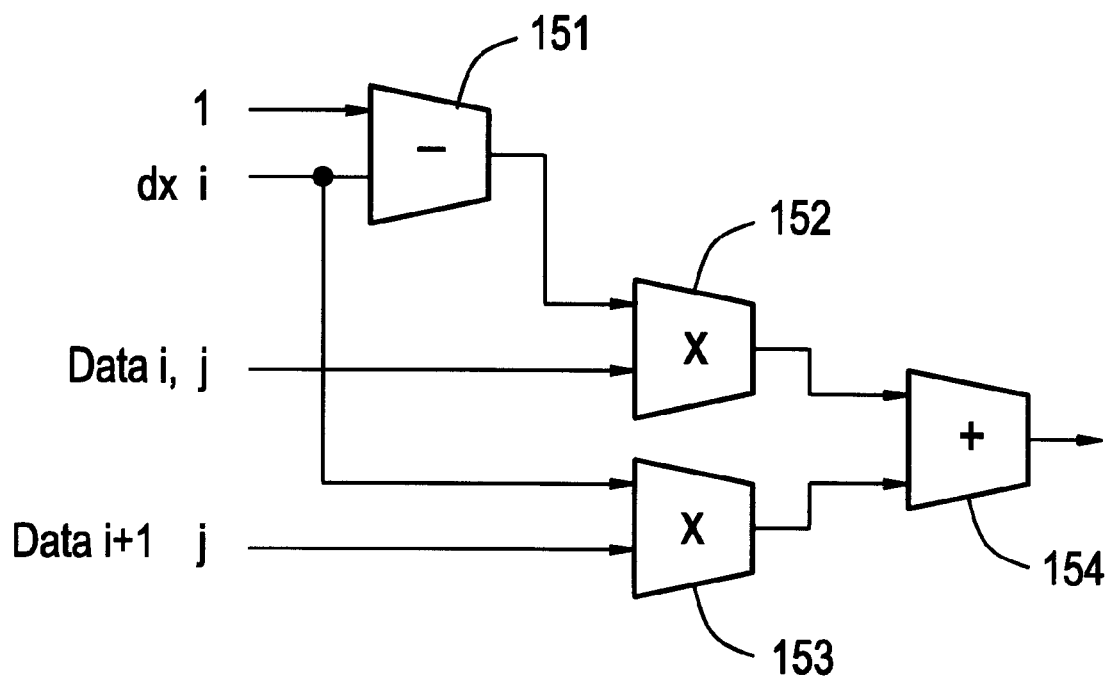
FIG. 7 is a layout block diagram of an embodiment of a correlations calculation circuit in the embodiment of FIG. 3.

In FIG. 7, the sign of the input signal was generalized, but, in terms of the first circuit, dxi is x and Datai,j and Datai+1,j are respectively color0 and color1 of pixels 71, 72.

Difference circuit 151 therefore outputs (1−x). Next, from multiplication circuits 152, 153 there are respectively output the product color0·(1−x) of (1−x) and color0, and the product color1·x of x and color1.

Summation circuit 154 finds the sum of the outputs of multiplication circuits 152, 153 and outputs color0·(1−x)+color1·x, which it then inputs to input terminal A of selection circuit 502. In addition, input terminals B, C of selection circuit 502 respectively input color0 and color1.

In addition, there are added to the respective pixel data of the texture map transparency flag information, as to whether the pixel is transparent or not (having H level if the pixel is transparent). This flag information is therefore input as a selector signal to terminals S0, S1 of selection circuit 502.

Selection circuit 502 selects and outputs either color01, which is the combined output of interpolation calculation circuit 501, or color0/color1, which is the original input prior to blending, depending on the logic of the selector signal that is input to these terminals S0, S1.

In other words, when neither color0 nor color1 is transparent (S0=S1=L logic), the blended output color01 of interpolation calculation circuit 501 is output. If only color0 is transparent (S0=H, S1=L logic), color01=color1, which is output. Further, if only color1 is transparent (S0=L, S1=H logic), color01=color0, which is output. If both color0 and color1 are transparent (S0=H, S1=H logic), the result of the blending is not specified. Under these conditions, the transparency flag of selection circuit 502 with respect to output color01 is the output of AND gate 503, and so becomes H logic. In this case, the color of a pixel of color01 is neglected.

As described above, by the first circuit, output color01 corresponding to the calculation formula of Mathematical Expression (3) is obtained. Furthermore, the operation of the second circuit constituted by interpolation calculation circuit 504, selection circuit 505 and AND gate 506 and of the third circuit constituted by interpolation calculation circuit 507, selection circuit 508 and AND gate 509 is identical.

Specifically, the second circuit inputs color2 and color3 and outputs an output color23 corresponding to the calculation of Mathematical Expression (4). The third circuit inputs the output color01 of the first circuit and the output color23 of the second circuit and outputs an output color corresponding to the calculation of Mathematical Expression (5).

Thus, as described by the embodiment with reference to the drawings, a pixel blending circuit according to the present invention can be implemented with a straightforward logic construction and transparent pixels can also be taken into account.

For the color of a transparent pixel, another adjacent color is applied, but, in an ordinary texture map, there is no effect on image quality, since adjacent pixels have continuity with some degree of correlation. Consequently, by application of the present invention, it is possible to lower costs of the image processing device and to simplify handling of image data.

What is claimed is:

1. A method of blending a plurality of pixels on a texture map corresponding to the pixels constituting a polygon, thereby finding texture data to be mapped on to the pixels constituting the polygon, comprising the steps of:

determining whether or not there are transparent pixels in said plurality of pixels on the texture map;

if there are no transparent pixels, blending said plurality of pixels on the texture map in accordance with the ratio with which a pixel constituting the polygon corresponds therewith;

if some of said plurality of pixels on the texture map are transparent pixels, substituting the transparent pixels by other adjacent pixels which are not transparent; and if all of said plurality of pixels on the texture map are transparent pixels, ignoring the plurality of pixels on the texture map.

2. A method of blending a plurality of pixels on a texture map corresponding to the pixels constituting a polygon, thereby finding texture data to be mapped on to pixels constituting the polygon, comprising:

a first step of determining whether or not there are transparent pixels in a first plurality of pixels adjacent to one row address direction on said texture map, and, if there are no transparent pixels in said first plurality of pixels adjacent to one row address direction, effecting blending in accordance with the ratio with which a pixel constituting this polygon corresponds to said first plurality of pixels, and, if some of said first plurality of pixels adjacent to one row address direction are transparent pixels, substituting these transparent pixels by adjacent pixels which are not transparent, and, if all of said first plurality of pixels adjacent to one row address direction are transparent pixels, ignoring said plurality of pixels;

a second step of determining whether or not there are transparent pixels in a second plurality of pixels adjacent to a row address direction adjacent said one row address direction on said texture map, and, if there are no transparent pixels in said second plurality of pixels adjacent to a row address direction adjacent said one row, effecting blending in accordance with the ratio with which a pixel constituting said polygon corresponds to said second plurality of pixels, and, if some of said second plurality of pixels adjacent to a row address direction adjacent to said one row are transparent pixels, substituting these transparent pixels by adjacent pixels which are not transparent, and, if all of said second plurality of pixels adjacent to a row address direction adjacent to said one row are transparent pixels, ignoring said second plurality of pixels; and a third step of comparing first texture pixel data obtained by said first step with second texture pixel data obtained by said second step and, if neither the first nor the second texture pixel data are transparent, effecting blending in accordance with the ratio with which a pixel constituting said polygon corresponds to said first and second texture pixel data, and, if any of said first and second texture pixel data are transparent, substituting these transparent texture pixel data by other texture pixel data which are not transparent, and, if all they are all transparent, ignoring said first and second texture pixel data.

3. A plural pixel blending circuit wherein said plurality of pixels on said texture map corresponding to a pixel constituting said polygon are blended, thereby finding texture data to be mapped on to pixels constituting said polygon, comprising:

an interpolation calculation circuit whereby blending is effected in accordance with the ratio with which a pixel constituting said polygon corresponds therewith, of a plurality of adjacent pixels on said texture map; and a selection circuit which inputs the output of this interpolation calculation circuit and said plurality of adjacent pixels and, as selection signal, flags indicating whether or not said plurality of adjacent pixels are respectively transparent, and, depending on these selection signals, if none of said plurality of pixels are transparent, selects the output of said interpolation calculation circuit, or, if any of said plurality of pixels are transparent, selects the pixels, of said plurality of pixels, which are not transparent, if all said plurality of pixels are transparent, inhibits the output.

4. The plural pixel blending circuit according to claim 3, further comprising an AND gate that outputs AND logic of the plurality of adjacent pixels.

5. A plural pixel blending circuit wherein said plurality of pixels on said texture map corresponding to a pixel constituting said polygon are blended, thereby finding texture data to be mapped on to pixels constituting said polygon, comprising:

first, second and third plural pixel blending circuits, each including an interpolation calculation circuit whereby blending is effected in accordance with the ratio with which a pixel constituting said polygon corresponds therewith, of a plurality of adjacent pixels on said texture map; and a selection circuit which inputs the output of this interpolation calculation circuit and said plurality of adjacent pixels and, as selection signal, flags indicating whether or not said plurality of adjacent pixels are respectively transparent, and, depending on these selection signals, if none of said plurality of pixels are transparent, selects the output of said interpolation calculation circuit, or, if any of said plurality of pixels are transparent, selects the pixels, of said plurality of pixels, which are not transparent, and, if all said plurality of pixels are transparent, inhibits the output, wherein the outputs of said first and second plural pixel blending circuits constitute two inputs of said interpolation computation circuit of said third plural pixel blending circuit.

6. An image processing device for image display of an object arranged in virtual three-dimensional space by constituting a plurality of polygons, comprising:

a memory device in which is stored a texture map that stores texture data at a plurality of co-ordinate positions specified by X and Y axes; and a texture mapping circuit that maps texture data that is read from said texture map onto each pixel constituting the plurality of respective polygons, said texture mapping circuit having a plural pixel blending circuit including an interpolation calculation circuit whereby blending is effected in accordance with the ratio with which a pixel constituting a polygon in question corresponds therewith, of a plurality of adjacent pixels on the texture map; and a selection circuit which inputs the output of said interpolation calculation circuit and said plurality of adjacent pixels and, as selection signal, flags indicating whether or not said plurality of adjacent pixels are respectively transparent, and, depending on these selection signals, if none of said plurality of pixels are transparent, selects the output of said interpolation calculation circuit, or, if any of said plurality of pixels are transparent, selects the pixels, of said plurality of pixels, which are not transparent, and, if all the plurality of pixels are transparent, inhibits the output.

7. The image processing device according to claim 6, wherein said plural pixel blending circuit further includes an AND gate that outputs AND logic of the plurality of adjacent pixels.

8. An image processing device for image display of an object arranged in virtual three-dimensional space by constituting a plurality of polygons, comprising:

a memory device in which is stored a texture map that stores texture data at a plurality of co-ordinate positions specified by X and Y axes; and a texture mapping circuit that maps texture data that is read from said texture map onto each pixel constituting the plurality of respective polygons, said texture mapping circuit having first, second and third plural pixel blending circuit, each including an interpolation calculation circuit whereby blending is effected in accordance with the ratio with which a pixel constituting a polygon in question corresponds therewith, of a plurality of adjacent pixels on the texture map; and a selection circuit which inputs the output of said interpolation calculation circuit and said plurality of adjacent pixels and, as selection signal, flags indicating whether or not said plurality of adjacent pixels are respectively transparent, and, depending on these selection signals, if none of said plurality of pixels are transparent, selects the output of said interpolation calculation circuit, or, if any of said plurality of pixels are transparent, selects the pixels, of said plurality of pixels, which are not transparent, and if all the plurality of pixels are transparent, inhibits the output, wherein the outputs of said first and second plural pixel blending circuits constitute two inputs of said interpolation computation circuit of said third plural pixel blending circuit.

* * * * *